(12) United States Patent  (10) Patent No.: US 8,794,129 B2
Cretors  (45) Date of Patent: Aug. 5, 2014

(54) SYSTEM AND METHODS FOR POPPING CORN AND PRODUCING OTHER TYPES OF EXPANDED FOODS

(75) Inventor: Charles D. Cretors, Lake Forest, IL (US)

(73) Assignee: C. Cretors & Company, Wood Dale, IL (US)

( * ) Notice: Subject to any disclaimer, the term of this patent is extended or adjusted under 35 U.S.C. 154(b) by 293 days.

(21) Appl. No.: 12/890,370

(22) Filed: Sep. 24, 2010

(65) Prior Publication Data

US 2011/0076372 A1 Mar. 31, 2011

Related U.S. Application Data

(60) Provisional application No. 61/245,867, filed on Sep. 25, 2009.

(51) Int. Cl.
*A23L 1/18* (2006.01)

(52) U.S. Cl.
USPC .......................................... 99/323.5; 99/323.9

(58) Field of Classification Search
USPC .................. 99/323, 323.4, 323.5, 323.9, 467, 99/321.6, 323.7, 323.8, 323.11
See application file for complete search history.

(56) References Cited

U.S. PATENT DOCUMENTS

| | | | |
|---|---|---|---|
| 1,251,291 A | 12/1917 | Scheeffer | |
| 1,436,400 A | 11/1922 | Mabey | |
| 1,477,704 A | 12/1923 | Holcomb et al. | |
| 1,501,114 A | 7/1924 | Howe | |
| 1,867,910 A | 7/1932 | Eakins | |
| 1,961,812 A | 6/1934 | Burch | |
| 1,987,388 A | 1/1935 | Cretors | |
| 2,123,663 A | 7/1938 | Roach | |
| 2,198,152 A | 4/1940 | Cooley et al. | |
| 2,232,954 A | 2/1941 | Manley | |
| 2,248,812 A | 7/1941 | Cretors | |
| 2,477,416 A | 7/1949 | Page | |
| 2,549,449 A | 4/1951 | Gibson | |
| 2,570,126 A | 10/1951 | Hobbs | |

(Continued)

FOREIGN PATENT DOCUMENTS

DE  8624682  12/1986
DE  20120429 U1  7/2002

(Continued)

OTHER PUBLICATIONS

International Search Report and Written Opinion for PCT/US2008/075083; Mailed on Nov. 12, 2008; Applicant: C. Cretors and Company, 8 pages.

(Continued)

*Primary Examiner* — Dana Ross
*Assistant Examiner* — Michael Laflame, Jr.
(74) *Attorney, Agent, or Firm* — Perkins Coie LLP (57) ABSTRACT

Machines for popping corn and producing puffed snacks and other expanded foods are described herein. In one embodiment, a flow-through popper circulates unpopped corn kernels through a popping chamber by use of a plurality of vanes that directionally control a flow of high velocity, high temperature and high pressure air. In this embodiment, the air in the popping chamber causes the unpopped corn kernels to circulate as they move through the length of the popping chamber without the need for an auger or other moving apparatus.

16 Claims, 5 Drawing Sheets

(56) References Cited

U.S. PATENT DOCUMENTS

| | | | |
|---|---|---|---|
| 2,586,347 A | 2/1952 | Kloster | |
| 2,604,030 A | 7/1952 | Cretors | |
| 2,654,823 A | 10/1953 | Altemiller | |
| 2,812,704 A | 11/1957 | Hawks | |
| 2,856,841 A | 10/1958 | Cretors et al. | |
| 2,858,761 A | 11/1958 | Denniss | |
| 2,907,264 A | 10/1959 | Bushway | |
| 2,939,379 A | 6/1960 | Schmitt | |
| 2,984,169 A | 5/1961 | Bushway | |
| 3,095,326 A | 6/1963 | Green et al. | |
| 3,120,168 A | 2/1964 | Lippert | |
| 3,140,952 A | 7/1964 | Cretors | |
| 3,156,451 A | 11/1964 | Waas | |
| 3,280,720 A * | 10/1966 | Kuhn | 99/323.9 |
| 3,450,068 A | 6/1969 | Temple | |
| 3,512,989 A | 5/1970 | Smith | |
| 3,554,115 A | 1/1971 | Manley et al. | |
| 3,568,782 A | 3/1971 | Cox | |
| 3,650,199 A | 3/1972 | Sachnik | |
| 3,697,289 A | 10/1972 | Day et al. | |
| 3,739,953 A | 6/1973 | Cretors | |
| 3,751,267 A | 8/1973 | Sachnik | |
| 3,783,854 A | 1/1974 | Hurko et al. | |
| 3,930,996 A | 1/1976 | Day et al. | |
| 4,120,236 A | 10/1978 | Blomberg | |
| 4,152,974 A * | 5/1979 | Tienor | 99/323.8 |
| 4,165,620 A | 8/1979 | Gehauf et al. | |
| 4,173,925 A | 11/1979 | Leon | |
| 4,178,843 A | 12/1979 | Crabtree et al. | |
| 4,182,229 A | 1/1980 | VandeWalker | |
| 4,206,695 A | 6/1980 | Cretors | |
| 4,288,686 A | 9/1981 | Cretors | |
| 4,331,124 A | 5/1982 | Seidel et al. | |
| 4,438,682 A | 3/1984 | King et al. | |
| 4,512,247 A | 4/1985 | Friedman | |
| 4,648,719 A | 3/1987 | Roben et al. | |
| 4,649,263 A | 3/1987 | Goodlaxson | |
| 4,763,568 A * | 8/1988 | Kiczek | 99/323.5 |
| 4,881,457 A * | 11/1989 | Lyga et al. | 99/323.5 |
| 4,914,834 A | 4/1990 | Sime | |
| 5,033,363 A | 7/1991 | King et al. | |
| 5,035,173 A | 7/1991 | Stein et al. | |
| 5,046,481 A | 9/1991 | Warwick | |
| 5,069,923 A | 12/1991 | Hubbard et al. | |
| 5,083,505 A | 1/1992 | Kohlstrung et al. | |
| 5,154,161 A | 10/1992 | Rogers et al. | |
| 5,180,898 A * | 1/1993 | Alden et al. | 219/388 |
| 5,203,256 A | 4/1993 | Mueller | |
| 5,263,405 A * | 11/1993 | Simon | 99/323.7 |
| 5,301,601 A | 4/1994 | Cretors | |
| 5,311,930 A | 5/1994 | Bruenn | |
| 5,315,919 A | 5/1994 | Hoeberigs | |
| 5,339,726 A | 8/1994 | Poulson | |
| 5,397,219 A | 3/1995 | Cretors | |
| 5,417,148 A | 5/1995 | Cavallo | |
| 5,419,239 A * | 5/1995 | Covington et al. | 99/357 |
| 5,445,073 A | 8/1995 | Gilwood | |
| 5,501,139 A | 3/1996 | Lee | |
| 5,513,558 A * | 5/1996 | Erickson et al. | 99/330 |
| 5,555,792 A | 9/1996 | Stein et al. | |
| 5,579,681 A | 12/1996 | Ubert et al. | |
| 5,590,582 A | 1/1997 | Weiss | |
| 5,605,091 A | 2/1997 | Garber | |
| 5,662,024 A | 9/1997 | Cretors et al. | |
| 5,690,018 A | 11/1997 | Hansen | |
| 5,694,830 A | 12/1997 | Hodgson et al. | |
| 5,743,172 A | 4/1998 | Weiss et al. | |
| 5,771,779 A | 6/1998 | Stein et al. | |
| 5,782,165 A * | 7/1998 | Glenboski et al. | 99/340 |
| 5,787,798 A | 8/1998 | Stein et al. | |
| 5,871,792 A | 2/1999 | Weiss et al. | |
| 5,979,301 A | 11/1999 | Perttola | |
| 6,000,318 A | 12/1999 | Weiss et al. | |
| 6,098,526 A | 8/2000 | Stein et al. | |
| 6,123,011 A | 9/2000 | Cretors | |
| 6,133,549 A | 10/2000 | Shih et al. | |
| 6,164,192 A | 12/2000 | Stein et al. | |
| 6,164,193 A | 12/2000 | Perttola | |
| 6,234,063 B1 | 5/2001 | Evers et al. | |
| 6,374,727 B1 | 4/2002 | Cretors | |
| 6,382,087 B1 | 5/2002 | Iiyama | |
| 6,412,395 B1 | 7/2002 | Weiss et al. | |
| 6,412,396 B1 | 7/2002 | Wright | |
| 6,460,451 B1 * | 10/2002 | Helman et al. | 99/323.5 |
| 6,534,103 B2 | 3/2003 | Weiss | |
| 6,578,468 B1 | 6/2003 | Horn | |
| 6,672,201 B2 | 1/2004 | Evans, Sr. et al. | |
| 6,872,923 B2 | 3/2005 | Cretors et al. | |
| 6,914,226 B2 | 7/2005 | Ottaway | |
| 7,024,986 B2 | 4/2006 | Kurosawa | |
| 7,846,493 B1 | 12/2010 | Cox | |
| 2003/0159591 A1 | 8/2003 | Evans et al. | |
| 2004/0026404 A1 | 2/2004 | Lerner | |
| 2004/0265993 A1 | 12/2004 | Darling et al. | |
| 2005/0056154 A1 | 3/2005 | Fu | |
| 2009/0041915 A1 | 2/2009 | Biechteler | |
| 2009/0126579 A1 | 5/2009 | Cretors et al. | |
| 2009/0208621 A1 | 8/2009 | Dotan | |
| 2009/0223378 A1 | 9/2009 | Cretors | |
| 2011/0027434 A1 | 2/2011 | Cretors | |
| 2011/0076373 A1 | 3/2011 | Cretors et al. | |
| 2011/0200727 A1 | 8/2011 | Biechteler | |
| 2012/0266756 A1 | 10/2012 | Cretors | |

FOREIGN PATENT DOCUMENTS

| | | |
|---|---|---|
| FR | 2401387 | 3/1979 |
| WO | WO-9310698 | 6/1993 |
| WO | WO-2004054384 A1 | 7/2004 |
| WO | WO-2012145717 | 10/2012 |

OTHER PUBLICATIONS

International Search Report and Written Opinion; PCT/EP05/009010, Mailed on Jan. 5, 2006. Applicant: Pfister and Pfister, 6 pages.

Non-Final Office Action; U.S. Appl. No. 11/661,050; Mailing Date: May 26, 2010, 19 pages.

Non-Final Office Action; U.S. Appl. No. 10/453,428; Mailing Date: Jul. 27, 2004, 6 pages.

Non-Final Office Action; U.S. Appl. No. 11/942,648; Mailing Date: May 27, 2011, 8 pages.

C. Cretors and Co.; "Diplomat" product manual for models DI20C, DI32C, D120F, DI32F, DI205, TD1205, TDI206, DI325 and TDI326; 1996, 58 pages.

C. Cretors and Co.; "Diplomat" product manual for models DI20CP, DI32CP, DI2OFP and DI32FP; 1989, 62 pages.

C. Cretors and Co.; Multi-product sell sheet for "The New Diplomat Counter Showcase" and "Thunder Kettle" for models G48E, EPR48E5 and PR48E5; dated 1990, 2 pages.

Gold Medal Products Co.; "Funfood Equipment & Supplies" catalog; vol. 56, dated 2000, 108 pages.

Internatinal Search Report and Written Opinion mailed Sep. 20, 2012, Application No. PCT/US2012/034579, Applicant C. Cretors & Company, 6 pages.

Loeb Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, (missing all even numbered pages) 33 pages.

Final Office Action; U.S. Appl. No. 11/661,050; Mailing Date: Nov. 26, 2010, 15 pages.

International Search Report and Written Opinion; PCT/US10/50442, Mailed on Nov. 23, 2010, Applicant: C. Cretors & Company, 10 pages.

* cited by examiner

SYSTEM AND METHODS FOR POPPING CORN AND PRODUCING OTHER TYPES OF EXPANDED FOODS

CROSS-REFERENCE TO RELATED APPLICATION

The present application claims priority to and the benefit of U.S. Provisional Application No. 61/245,867, filed Sep. 25, 2009, and titled "SYSTEMS AND METHODS FOR POPPING CORN AND PRODUCING OTHER TYPES OF EXPANDED FOODS," which is incorporated herein by reference in its entirety.

TECHNICAL FIELD

The following disclosure relates generally to systems for popping corn and producing puffed snacks and other types of expanded foods.

BACKGROUND

Various types of machines are known for popping corn and producing expanded foods such as puffed snacks. Some popcorn poppers include a heated surface (e.g., a popping kettle) that heats the corn and causes it to pop. Other popcorn poppers use hot air to pop corn.

A typical flow-through popcorn popper or snack puffer includes a rotating "puffing drum" that consists of a steel auger wrapped in a perforated metal skin. The puffing drum is positioned in a heated cabinet and rotated at a constant speed. Material (e.g., an extruded starch or other snack material) is introduced in one end of the drum, and the auger moves the material through the drum and out the far end. Depending on the type of material, the material can reside in the drum anywhere from about 30 seconds to about 300 seconds. As the material moves through the drum, a high pressure fan blows hot air from an electric heating element or gas burner upwardly through the perforated drum with enough heat and pressure to suspend and fluidize the material. For example, typical air temperatures for popping corn or puffing starch-based snacks within the drum can range from about 400° F. to about 450° F. Approximately 90 percent of the air that is driven upwardly through the drum can be reheated and re-circulated through the drum.

Because of the relatively high number of moving parts, conventional flow-through poppers and flow-through puffers can be expensive to manufacture.

DETAILED DESCRIPTION

The present disclosure is directed generally to machines for popping corn and/or producing expanded foods such as puffed snacks. Several details describing structures and processes that are well-known and often associated with popcorn machines and similar machines are not set forth in the following description to avoid unnecessarily obscuring embodiments of the disclosure. Moreover, although the following disclosure sets forth several embodiments, several other embodiments can have different configurations, arrangements, and/or components than those described herein. In particular, other embodiments may have additional elements, and/or may lack one or more of the elements described below with reference to FIGS. 1-5.

Figure 1:
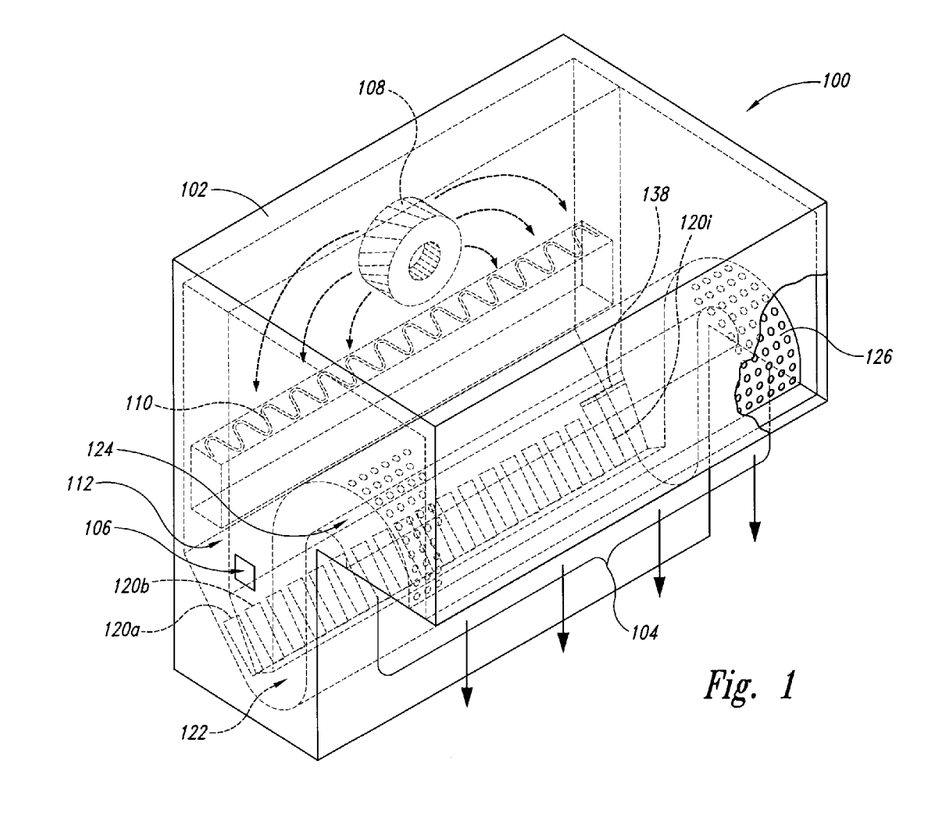
FIG. 1 is a partially schematic isometric view of a popcorn machine configured in accordance with an embodiment of the disclosure.

FIG. 1 is a partially cut-away schematic isometric view of a machine for producing popcorn and other types of expanded food (e.g., puffed snacks such as puffed starch-based snacks) configured in accordance with an embodiment of the disclosure. For ease of reference, the machine is identified as a popcorn machine 100. However, the machine 100 can also be used to produce puffed or expanded snacks and other food products.

In the illustrated embodiment, the popcorn machine 100 includes a body or cabinet 102 that can be manufactured from a suitable sheet metal (e.g., stainless steel) using suitable methods known in the art. The cabinet 102 houses at least one air mover 108 that drives high pressure air past a heater 110 and into an air plenum 112 positioned below the heater 110. In some embodiments, the heater 110 can include one or more electric heating coils or elements. In other embodiments, the heater 110 can include a gas burner (e.g., a natural gas burner) for heating the air flowing into the plenum 112.

In the illustrated embodiment the air mover 108 can include a fan, such as a conventional centrifugal or radial fan that draws air in through a central inlet and discharges high pressure air outwardly through the fan blades. In other embodiments, the popcorn machine 100 can include other types of air movers for driving high pressure air over or past the heater 110 and into the plenum 112.

A raw corn or raw material inlet 106 is located on one side of the cabinet 102 and is configured to receive raw corn kernels (or other unexpanded food pieces or particles) that fall downwardly into the air plenum 112 upstream of a plurality of directional control vanes 120 (identified individually as vanes 120a-120i). In the illustrated embodiment, the vanes 120 can include a series of individual surfaces or blades that are equally spaced (or at least approximately equally spaced) across the entire width of the lower portion of the air plenum 112. In certain embodiments, all of the vanes 120 can have the same shape and size; in other embodiments, some of the vanes may have different shapes and sizes. Although only a portion of the vanes 120 extending across the lower portion of the air plenum 112 are shown in FIG. 1 for ease of illustration, it should be understood that the plurality of vanes 120 in the illustrated embodiment extend across the entire air plenum 112 from left to right, except at the right-most end of the air plenum 112 where the airflow from the heater 110 is blocked by an air blocker 138.

As described in greater detail below, the heated, high pressure air flowing from the heater 110 is directed downwardly through the openings between the vanes 120 and accelerates as it enters a semi-circular popping chamber 122 (or, in the case of other expanded foods, a food expanding chamber 122). The high pressure, high velocity heated air flowing into the semi-circular popping chamber 122 causes the raw popcorn entering the left side of the popping chamber 122 to move upwardly along a portion of the outside wall of the popping chamber 122 until it reaches a low pressure zone in the inlet of a passageway 124 just above the popping chamber 122. The low pressure zone allows the unpopped kernels to fall back down into the popping chamber 122 and the cycle is repeated.

In the illustrated embodiment, the vanes 120 are parallel to each other and oriented at an angle relative to the vertical direction. In other words, the vanes 120 direct the high pressure, high temperature air into the popping chamber 122 at a slight angle. As a result, the unpopped corn kernels migrate from left to right as they circulate through the popping chamber 122. As described in greater detail below, once the popcorn pops, the density of the popped corn decreases enough so that the low pressure air in the passageway 124 is sufficient to blow the popped corn upwardly and then out of the popcorn machine 100 through an outlet 104. In the illustrated embodiment, the popcorn outlet 104 extends across the full width, or a substantial portion of the full width, of the popcorn machine 100.

In another aspect of this embodiment, an upper portion of the popped corn passageway 124 includes a perforated sidewall 126 that allows heated air to flow back into the cabinet 102 and re-circulate through the air mover 108, past the heater 110 and into the popping chamber 122. These and other aspects of the popcorn machine 100 are described in greater detail below with reference to FIGS. 2-5.

Figure 2:
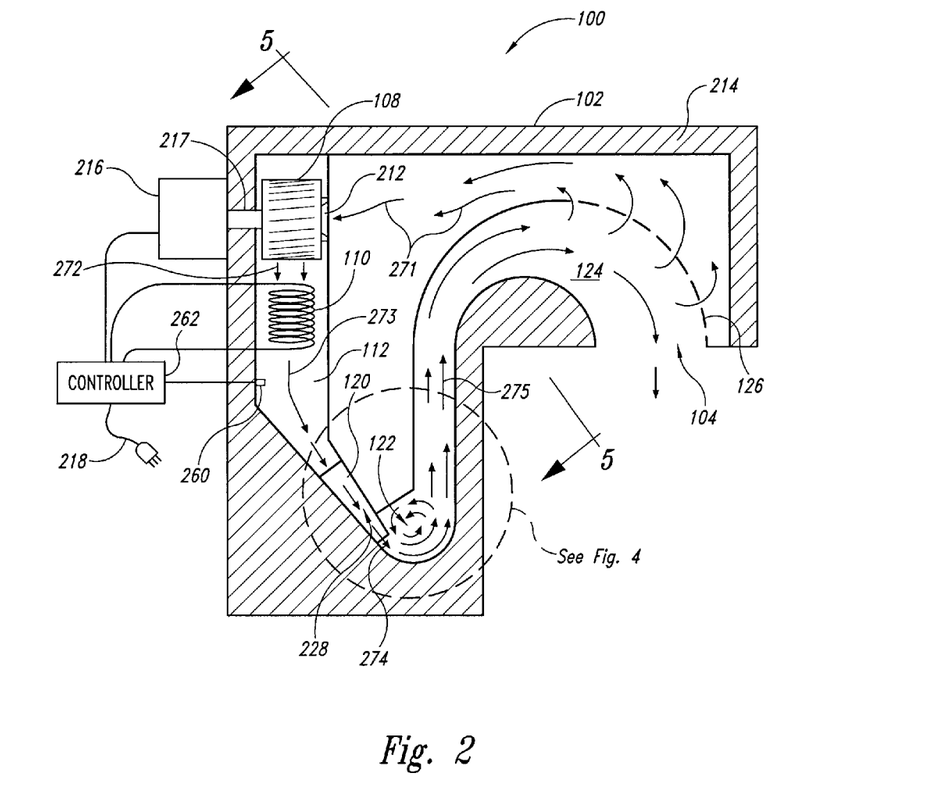
FIG. 2 is a partially schematic, cross-sectional side elevation view of the popcorn machine of FIG. 1.

FIG. 2 is a cross-sectional side elevation view of the popcorn machine 100 configured in accordance with an embodiment of the disclosure. Various types of suitable insulation 214 known in the art can be placed between portions of the air plenum 112, the popping chamber 122, etc., and the outer walls of the cabinet 102 to reduce noise and heat losses during operation of the machine 100. In the illustrated embodiment, a power cord 218 can be used to provide facility electric power to the heater 110 and an electric motor 216 that rotatively drives the air mover 108 via a shaft 217. Air (identified by first arrows 271) flows into the air mover 108 through an inlet 212. High pressure air (identified by second arrows 272) is discharged from the air mover 108 and directed downwardly past or through the heating coils of the heater 110. One or more temperature sensors 260 (e.g., an electric thermocouple, thermostat, etc.) can be positioned inside the air plenum 112 downstream of the heater 110 to sense the temperature of the air flowing into the air plenum 112. The temperature sensor 260 can be operably connected to a controller 262 (e.g., a programmable logic controller or similar processing device) that in turn controls electric power to the heating coils as necessary to maintain the temperature of the air flowing into the air plenum 112 within a desired range (e.g., from about 400° F. to about 450° F.) suitable for popping corn or puffing other raw food materials. The high temperature, high pressure air (identified by third arrows 273) accelerates as it flows through the air plenum 112 and past the directional control vanes 120 because the plenum 112 progressively tapers toward an inlet 228. In the illustrated embodiment, the inlet 228 is relatively wide and narrow in height. As a result, high temperature, high pressure and high velocity air (identified by fourth arrows 274) flows into the popping chamber 122 through the inlet 228.

As shown in FIG. 2, the high velocity air flowing into the popping chamber 122 flows in a circular motion from the high pressure, laminar flow along the bottom and outer surface of the popping chamber 122 to the lower pressure zone above the popping chamber. Some lower pressure air flows out of the popping chamber 122 through the passageway 124, as schematically identified by fifth arrows 275. A portion of this airflow passes through the perforated sidewall 126 in the upper portion of the passage 124, and re-circulates back into the air mover 108 through the inlet 212. Re-circulating hot air in this manner can reduce the energy required to bring the air up to the required popping (or puffing) temperature.

Figure 3:
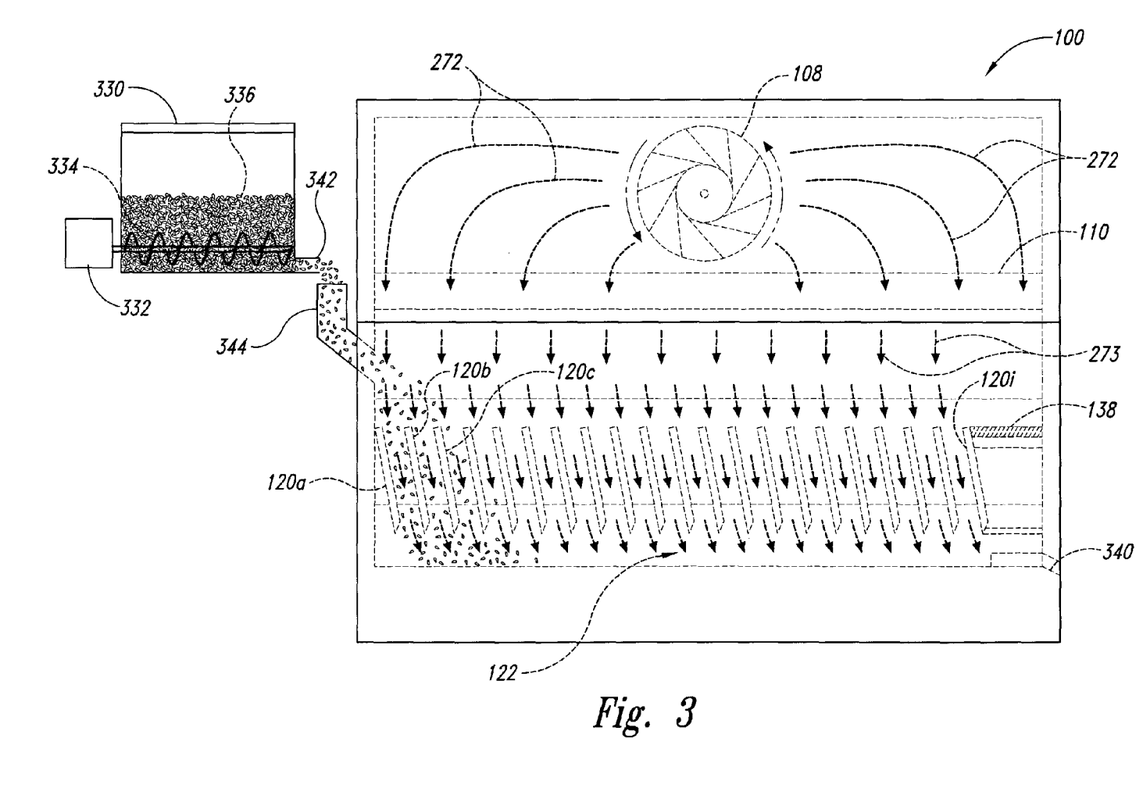
FIG. 3 is a partially schematic, front elevation view of the popcorn machine of FIG. 1.

FIG. 3 is a front elevation view of the popcorn machine 100 configured in accordance with an embodiment of the disclosure. A hopper or other suitable vessel 330 can hold a large amount of raw popcorn kernels 336 (or other food materials) for popping in the machine 100. The vessel 330 can include an auger 334 rotatably coupled to a variable speed electric motor 332. As the auger 334 rotates at a suitable speed, it moves unpopped corn kernels 336 from the vessel 330 through an outlet 342 and into an inlet chute 344. The inlet chute 344 extends through the opening 106 in the sidewall of the cabinet 102 (FIG. 1), and dispenses the unpopped corn kernels 336 onto a left side portion of the air plenum 112 (FIG. 2).

The high pressure, high temperature air flowing from the heater 110 blows the corn kernels 336 downwardly through the directional control vanes 120 and into the semi-circular popping chamber 122. As described in greater detail below with reference to FIGS. 4 and 5, the vanes 120 are angled relative to the vertical so that the high pressure, high temperature and high velocity air exiting the vanes 120 drives the kernels 336 in an angular path toward the bottom of the popping chamber 122. The force of the air lifts the raw corn 336 (or other product) lying on the bottom of the chamber and causes it to circulate around the chamber as it moves from left to right. When the raw corn 336 pops, it is blown upwardly and out of the popping chamber 122 because of its lower density. The higher density unpopped kernels 336, however, continue to circulate and move sideways through the chamber 122 until they are popped and blown out of the chamber 122. Any raw corn 336 that remains unpopped, however, is ultimately blown out of the popping chamber 122 through a scrap outlet 340 positioned in the bottom, right-most portion of the chamber 122.

Figure 4:
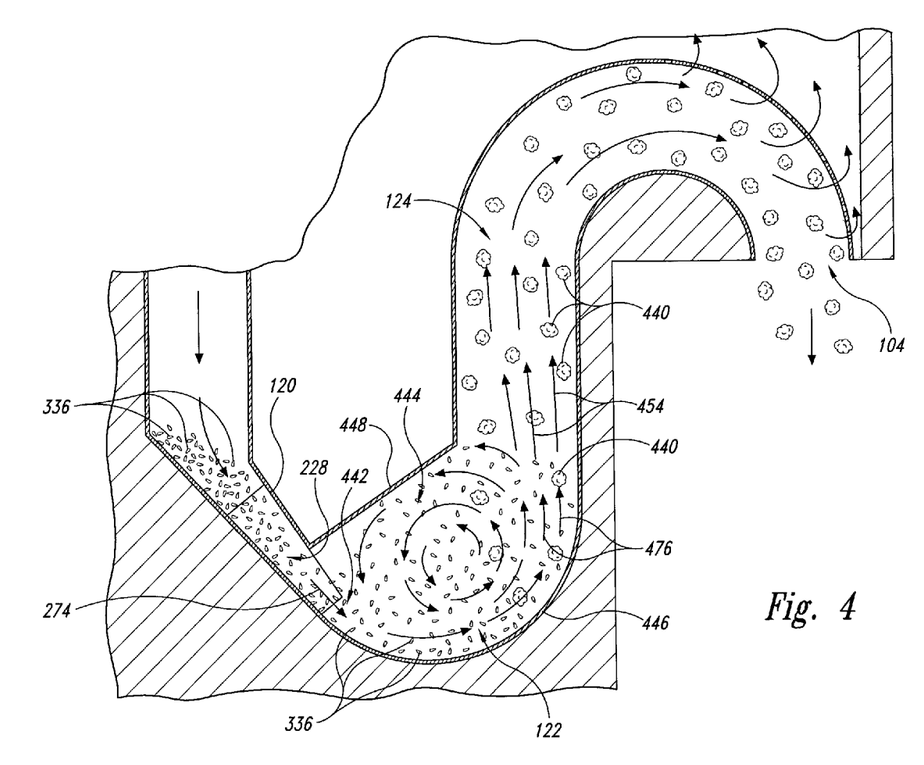
FIG. 4 is an enlarged, partially schematic cross-sectional view taken from FIG. 2 and illustrating aspects of a popping chamber configured in accordance with an embodiment of the disclosure.

FIG. 4 is an enlarged cross-sectional view of the popping chamber 122 illustrating the path of the raw popcorn 336 as it flows into the popping chamber 122 past the vanes 120. The high temperature, high pressure and high velocity air (identified by the fourth arrows 274) blows the raw corn kernels 336 into a high pressure, high temperature, and high velocity zone 442 of the semi-circular popping chamber 122 through the inlet 228. Initially, the air flow is laminar (or at least approximately laminar) and follows the outside wall 446 of the popping chamber 122 as it lifts the unpopped kernels 336 upwardly in a circular flow path identified by sixth arrows 476. As the raw corn kernels 336 are carried upward in the air stream, they tend to fall out of the high pressure, high velocity air stream and back into a low pressure, low velocity zone 444. When the raw kernels 336 fall back to the bottom of the chamber 122, however, the entering air in the high pressure, high temperature and high velocity zone 442 picks the kernels back up and drives them around in another cycle. Because the control vanes 120 extend across the width of the popcorn machine 100 as shown in FIG. 5, the raw kernels 336 describe a spiral or a helical path as they move from left to right and are continuously picked up and dropped back down by the air flow in the popping chamber 122.

Air flows into the popping chamber 122 through the relatively small inlet 228 (FIG. 4), which causes the air to flow at a relatively high velocity capable of lifting and momentarily suspending the kernels in the air stream. In contrast, the passageway 124 where air exits the popping chamber 122 is considerably larger than the air inlet 228. As a result, the air velocity and pressure drops in the passageway 124. Raw popcorn kernels typically have a density of approximately 48 pounds per cubic foot. As a result, when the raw popcorn 336 enters the low pressure airflow of the passageway 124, the low pressure airflow can no longer suspend or support the kernels and they fall to the bottom of the popping chamber 122 and repeat the rising and falling cycle. In contrast, popped corn 440 can have a much lower density of about 1.5 pounds per cubic foot. As a result, the relatively low air pressure in the passageway 124 is sufficient to lift the popped corn 440 and blow it out of the popcorn machine 100 through the outlet 104 (FIG. 2). Consequently, only unpopped corn kernels continue to migrate from left to right in the popping chamber 122.

Figure 5:
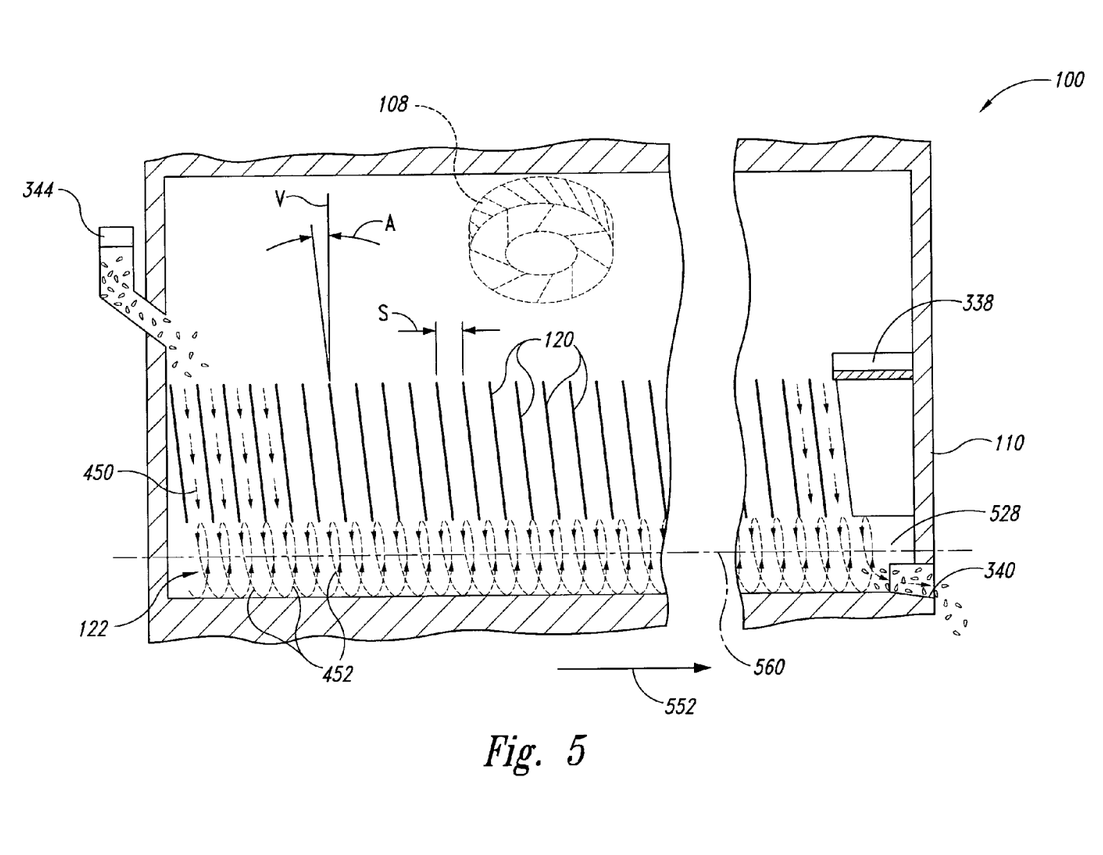
FIG. 5 is a partially schematic front elevation view taken along line 5-5 in FIG. 2 and illustrating the path of raw popcorn or other unexpanded food particles as it moves through a popping chamber configured in accordance with an embodiment of the disclosure.

Referring next to FIG. 5, in the illustrated embodiment each of the directional control vanes 120 is positioned at an angle "A" relative to the vertical direction V. For example, in the illustrated embodiment the angle "A" can be from about 1° to about 5°, or about 3°. Accordingly, in the illustrated embodiment the control vanes 120 are canted at an oblique angle (e.g., an angle of from about 85° to about 89°) relative to a central or longitudinal axis 560 of the popping chamber 122. In other embodiments, the control vanes 120 can be positioned at other angles relative to the vertical direction V and/or the popping chamber 122. Moreover, in the illustrated embodiment the vanes 120 can be equally spaced apart from each other by a distance "S." For example, in the illustrated embodiment the distance "S" can be from about 0.25 inch to about 1.5 inches, or about 0.5 inch. In other embodiments, the control vanes 120 can be spaced apart from each other at different intervals, including uneven spacing.

As discussed above, because of the angle of the control vanes 120, the unpopped corn kernels 336 move a small amount from left to right with each cycle around the inside of the popping chamber 122. The air blocker 338 (e.g., a blocking plate or similar structure) is positioned at the right-most portion of the popcorn machine 100 to block airflow from the air mover 108 on the far right end of the popping chamber 122. This allows any unpopped corn kernels to be blown out of the popping chamber 122 through the scrap outlet 340. The time for a particular product to travel from one end (e.g., the left end) of the popping chamber 122 to the other (e.g., the right end) can be controlled by, for example, the angle "A" of the control vanes 120 and/or the operating speed of the air mover 108 (which in turn affects the velocity of the air flow).

One advantage of embodiments of the machine 100 described above is that it can be used as both a "batch" popper and a "continuous" popper. In the continuous process, the scrap outlet 340 provides a means whereby kernels that are not popped exit the chamber as fresh kernels continuously flow into the chamber through the inlet chute 344. In addition, as corn pops in the chamber 122 it is quickly blown out of the high temperature heat zone and out of the machine 100 through the popped corn outlet 104 (FIG. 2). This is desirable because keeping popped corn in a relatively high temperature environment or zone can cause the corn to shrink in volume.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the invention is not limited, except as by the appended claims.

I claim:

1. A popcorn machine comprising:
   a popping chamber extending along a horizontal axis from a first end portion to a second end portion;
   an air mover that drives air along an air flow path past a heat source and into the popping chamber; and
   a plurality of vanes positioned in the air flow path, the plurality of vanes including at least three vanes arranged in a row extending parallel to the horizontal axis and adjacent to the popping chamber from the first end portion toward the second end portion, wherein the vanes are positioned at an angle relative to the popping chamber, and wherein the vanes direct heated air into the popping chamber at an angle to move unpopped corn kernels along the horizontal axis in a direction from the first end portion toward the second end portion.

2. A popcorn machine comprising:
   a popping chamber extending along a horizontal axis from a first end portion to a second end portion;
   an air mover that drives air along an air flow path past a heat source and into the popping chamber; and
   a plurality of vanes positioned in the air flow path, the plurality of vanes including at least three vanes arranged in a row extending parallel to the horizontal axis and adjacent to the popping chamber, wherein the plurality of vanes are parallel to each other, and wherein the vanes are positioned at an angle relative to the popping chamber and direct heated air into the popping chamber at an angle.

3. The popcorn machine of claim 1 wherein the air flows into the popping chamber through an inlet, and wherein the plurality of vanes are fixed at an angle relative to the inlet.

4. The popcorn machine of claim 1 wherein the air flows into the popping chamber through an inlet, and wherein the plurality of vanes are arranged across the inlet.

5. The popcorn machine of claim 1 wherein the plurality of vanes are positioned at an oblique angle relative to the horizontal axis.

6. The popcorn machine of claim 1 wherein the air flows into the popping chamber through a plenum, and wherein the plurality of vanes are fixedly attached to a wall portion of the plenum.

7. The popcorn machine of claim 1 wherein the air flows into the popping chamber through a plenum, wherein the plenum tapers inwardly toward the popping chamber to accelerate the air flowing into the popping chamber, and wherein the plurality of vanes are fixedly attached to a wall portion of the plenum.

8. The popcorn machine of claim 1 wherein the popping chamber includes an inlet positioned below an outlet, wherein the vanes direct high velocity, heated air into the popping chamber at an angle through the inlet, wherein the high velocity, heated air drives unpopped corn kernels through the popping chamber in a generally spiral path, and wherein the high velocity, heated air further drives popped corn upwardly and out of the popping chamber through the outlet.

9. The popcorn machine of claim 1, further comprising:
   an inlet plenum that directs high velocity, heated air into the popping chamber through the vanes; and
   an outlet passage that directs popped corn away from the popping chamber, wherein the outlet passage has a perforated sidewall that allows a portion of the heated air from the popping chamber to recirculate through the air mover.

10. A machine for producing expanded food, the machine comprising:
- a heat source;
- a food expanding chamber oriented along a horizontal axis and having a first end portion spaced apart from a second end portion;
- an air mover that drives air in a flow path past the heat source and into the food expanding chamber; and
- a plurality of air flow control surfaces positioned in an air flow path between the heat source and the food expanding chamber, wherein the plurality of air flow control surfaces includes at least three air flow control surfaces arranged in a row extending parallel to the horizontal axis, and wherein the individual control surfaces are positioned at an oblique angle relative to the food expanding chamber to control the direction of heated air flowing into the food expanding chamber and to drive unpopped corn kernels along the horizontal axis in a direction from the first end portion toward the second end portion.

11. The machine of claim 10 wherein the air flow control surfaces remain stationary relative to the food expanding chamber.

12. A machine for producing expanded food, the machine comprising:
- a heat source;
- a food expanding chamber oriented along a horizontal axis;
- an air mover that drives air in a flow path past the heat source and into the food expanding chamber, wherein the air mover drives air into the food expanding chamber through an elongate inlet that extends generally parallel to the horizontal axis; and
- a plurality of air flow control surfaces positioned in an air flow path between the heat source and the food expanding chamber, the plurality of air flow control surfaces including at least three individual air flow control surfaces, wherein the individual air flow control surfaces are positioned at an oblique angle relative to the food expanding chamber to control the direction of heated air flowing into the food expanding chamber, and wherein the plurality of air flow control surfaces are arranged in a row that extends across the inlet and parallel to the horizontal axis.

13. A machine for producing expanded food, the machine comprising:
- a heat source;
- a food expanding chamber oriented along a horizontal axis from a first end portion to a second end portion;
- an air mover that drives air in a flow path past the heat source and into the food expanding chamber, wherein the air mover drives air into the food expanding chamber through an elongate inlet that extends generally parallel to the horizontal axis; and
- a plurality of air flow control surfaces positioned in an air flow path between the heat source and the food expanding chamber, the plurality of air flow control surfaces including a least three individual air flow control surfaces, wherein the individual air flow control surfaces are positioned at an oblique angle relative to the food expanding chamber to control the direction of heated air flowing into the food expanding chamber, and wherein the plurality of air flow control surfaces are arranged in a row in edgewise orientation across the inlet and parallel to the horizontal axis from the first end portion to the second end portion.

14. A machine for producing expanded food, the machine comprising:
- a heat source;
- a food expanding chamber extending along a horizontal axis;
- an air mover that drives air in a flow path past the heat source and into the food expanding chamber;
- a plurality of air flow control surfaces positioned in an air flow path between the heat source and the food expanding chamber, the plurality of air flow control surfaces including at least three individual air flow control surfaces, wherein the plurality of air flow control surfaces are arranged in a row extending parallel to the horizontal axis and adjacent to the food expanding chamber, and wherein the individual control surfaces are positioned at an oblique angle relative to the food expanding chamber to control the direction of heated air flowing into the food expanding chamber;
- a food inlet positioned toward a first end portion of the food expanding chamber; and
- a scrap outlet positioned toward a second end portion of the food expanding chamber, wherein unexpanded food particles flow into the food expanding chamber through the food inlet, and wherein unexpanded food particles flow out of the food expanding chamber through the scrap outlet.

15. The machine of claim 10, further comprising:
- an unexpanded food inlet positioned toward the first end portion of the food expanding chamber; and
- an expanded food outlet positioned toward an upper portion of the food expanding chamber, wherein unexpanded food particles flow into the food expanding chamber through the food inlet, and wherein expanded food particles flow out of the food expanding chamber through the expanded food outlet.

16. The popcorn machine of claim 1, wherein the popping chamber has a semi-circular cross-sectional shape extending parallel to the horizontal axis to move the unpopped corn kernels in a generally spiral path from the first end portion to the second end portion, and wherein the popcorn machine further comprises:
- a plenum defining an inlet to the popping chamber, wherein the inlet extends from proximate the first end portion of the popping chamber to proximate the second end portion, wherein the plurality of vanes are positioned across the inlet.

* * * * *

UNITED STATES PATENT AND TRADEMARK OFFICE
CERTIFICATE OF CORRECTION

| | | |
|---|---|---|
| PATENT NO. | : 8,794,129 B2 | Page 1 of 1 |
| APPLICATION NO. | : 12/890370 | |
| DATED | : August 5, 2014 | |
| INVENTOR(S) | : Charles D. Cretors | |

It is certified that error appears in the above-identified patent and that said Letters Patent is hereby corrected as shown below:

On Title Page 2, in column 2, item (56) under "Other Publications", line 20, delete "Internatinal" and insert -- International --, therefor.

In the Claims

In column 8, line 1, in claim 13, delete "a least" and insert -- at least --, therefor.

Signed and Sealed this
Twelfth Day of May, 2015

Michelle K. Lee
*Director of the United States Patent and Trademark Office*